United States Patent
Calciu et al.

(10) Patent No.: US 11,329,927 B2
(45) Date of Patent: May 10, 2022

(54) AUTOMATIC MTU CONFIGURATION ON A L2 DOMAIN

(71) Applicant: LENOVO Enterprise Solutions (Singapore) PTE. LTD., New Tech Park (SG)

(72) Inventors: Corneliu-Ilie Calciu, Bucharest (RO); George-Andrei Stanescu, Ilfov (RO); Radu M. Iorga, Bucharest (RO); Bogdan Chifor, Nojorid (RO)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/917,311

(22) Filed: Jun. 30, 2020

(65) Prior Publication Data

US 2021/0409339 A1 Dec. 30, 2021

(51) Int. Cl.
| | | |
|---|---|---|
| *H04L 12/805* | (2013.01) | |
| *H04L 47/36* | (2022.01) | |
| *H04B 1/16* | (2006.01) | |
| *H04L 43/0829* | (2022.01) | |
| *H04L 41/0813* | (2022.01) | |
| *H04L 69/324* | (2022.01) | |

(52) U.S. Cl.
CPC ............... *H04L 47/36* (2013.01); *H04B 1/16* (2013.01); *H04L 41/0813* (2013.01); *H04L 43/0829* (2013.01); *H04L 69/324* (2013.01)

(58) Field of Classification Search
CPC . H04L 47/36; H04L 41/0813; H04L 43/0829; H04L 69/324; H04L 69/166;
(Continued)

(56) References Cited

U.S. PATENT DOCUMENTS

| | | | | |
|---|---|---|---|---|
| 8,923,299 B2* | 12/2014 | Kamble | .............. | H04L 49/9057 370/392 |
| 10,798,014 B1* | 10/2020 | Krishnamurthy | ....... | H04L 47/36 |

(Continued)

OTHER PUBLICATIONS

Microsoft, "3.1.1.3 MTU Negotiation", https://docs.microsoft.com/en-us/openspecs/windows_protocols/ms-rdpeudp/ffbc66ef-e79f-49f7-b208-76d4a68339e8 dated Sep. 23, 2019.

(Continued)

*Primary Examiner* — Hardikkumar D Patel
(74) *Attorney, Agent, or Firm* — Kunzler Bean & Adamson; Bruce R. Needham

(57) ABSTRACT

An apparatus includes a message receiver circuit that receives, at a port of a network node, a message from a neighboring network node. The message includes a maximum transmission unit ("MTU") of the neighboring network node. The network nodes communicate using a layer-2 protocol. The apparatus includes a comparison circuit that determines if the received MTU is larger than an MTU for the port, and an approval circuit that, after determining that the received MTU is larger than the port's MTU, determines if the received MTU is supported by the network node. The method includes an increase circuit that, after determining that the received MTU is supported, changes the MTU of the network node's ports to match the received MTU, and a message circuit that, after determining that the received MTU is supported, sends a message with the MTU to network nodes connected to ports of the network node.

20 Claims, 5 Drawing Sheets

(58) Field of Classification Search
CPC ... H04L 41/25; H04L 43/0847; H04L 69/325;
H04L 43/16; H04L 69/16; H04L 41/0677;
H04L 63/0272; H04L 67/142; H04L
41/5009; H04L 43/50; H04L 67/42; H04L
69/161; H04L 47/365; H04L 43/0852;
H04L 43/10; H04L 47/32; H04L 41/16;
H04L 49/25; H04B 1/16; G06N 20/00
See application file for complete search history.

(56) References Cited

U.S. PATENT DOCUMENTS

2020/0252331 A1* 8/2020 Singal .................. H04L 45/245
2020/0259758 A1* 8/2020 Vytla .................. H04L 41/0813

OTHER PUBLICATIONS

Cisco, "Resolve IPv4 Fragmentation, MTU, MSS, and PMTUD Issues with GRE and IPsec" https://www.cisco.eom/c/en/us/support/docs/ip/generic-routing-encapsulation-gre/25885-pmtud-ipfrag.html dated Jan. 8, 2019, pp. 1-27.

Juniper Networks, "Device Discovery Using LLDP and LLDP-MED on Switches" https://www.juniper.net/documentation/en_US/junos/topics/topic-map/device-discovery-using-lldp-lldp-med.html dated Jul. 8, 2019, pp. 1-17.

IEA Software, Inc. "MTU Path—Maximum network path size scan utility" https://www.iea-software.com/products/mtupath/ retrieved Dec. 11, 2019, pp. 1-2.

* cited by examiner

(12) United States Patent

AUTOMATIC MTU CONFIGURATION ON A L2 DOMAIN

FIELD

The subject matter disclosed herein relates to data networks and more particularly relates to automatic maximum transmission unit ("MTU") in a layer-2 domain.

BACKGROUND

Today most of the data networking vendors have support for jumbo frames on the network equipment like network nodes, such as switches and routers. Using jumbo frames reduces the overhead and also the central processing units ("CPU") cycles used to process the packets. In a layer-2 domain a MTU configuration mismatch will cause packet loss and also possible packet truncation in case of a cut-through switching mode. This packet loss is affects data transfer across the data network. Packet fragmentation is not supported for layer-2 data networks, so the network equipment cannot automatically solve such conditions. The challenge for the network administrators is to configure the same MTU on all the interfaces from the network equipment, because not all the network equipment vendors are using same default MTU value.

BRIEF SUMMARY

An apparatus for automatic MTU configuration includes an MTU message receiver circuit that is configured to receive, at a port of a network node, a message from a directly connected neighboring network node. The message includes an MTU of the neighboring network node where the network node and the neighboring network node are part of a data network of network nodes communicating using a layer-2 protocol. The apparatus includes an MTU comparison circuit that is configured to determine if the received MTU of the neighboring network node is larger than an MTU for the port, and an MTU approval circuit that, in response to the MTU comparison circuit determining that the received MTU is larger than the MTU for the port, is configured to determine if a size of the received MTU is supported by the network node. The method includes an MTU increase circuit that, in response to the MTU approval circuit determining that the received MTU is supported, is configured to change the MTU of the ports of the network node to match the received MTU, and an MTU message circuit that, in response to the MTU approval circuit determining that the received MTU is supported, is configured to send a message to network nodes connected to ports of the network node. The message includes the received MTU.

Another apparatus for automatic MTU configuration includes an MTU message receiver circuit that is configured to receive, at a port of a network node, a message from a directly connected neighboring network node. The message includes an MTU of the neighboring network node where the network node and the neighboring network node are part of a data network of network nodes communicating using a layer-2 protocol. The apparatus includes an MTU comparison circuit that is configured to determine if the received MTU of the neighboring network node is larger than an MTU for the port. The apparatus includes an MTU approval circuit that, in response to the MTU comparison circuit determining that the received MTU is larger than the MTU for the port, is configured to determine if a size of the received MTU is supported by the network node. In response to the MTU approval circuit determining that the received MTU is supported, the apparatus includes an MTU increase circuit that is configured to change the MTU of the ports of the network node to match the received MTU, an MTU timer circuit that is configured to start an MTU timer for each port of the network node, except for the port that received the message with the received MTU, and an MTU message circuit that is configured to send a message to network nodes connected to ports of the network node, the message includes the received MTU.

A method for automatic MTU configuration includes receiving, at a port of a network node, a message from a directly connected neighboring network node. The message includes an MTU of the neighboring network node where the network node and the neighboring network node are part of a data network of network nodes communicating using a layer-2 protocol. The method includes determining if the received MTU of the neighboring network node is larger than an MTU for the port. In response to determining that the received MTU is larger than the MTU for the port, the method includes determining if a size of the received MTU is supported by the network node. In response to determining that the received MTU is supported, the method includes changing the MTU of the ports of the network node to match the received MTU and sending a message to network nodes connected to ports of the network node, the message includes the received MTU. In response to determining that the received MTU is not supported, the method includes taking corrective action.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
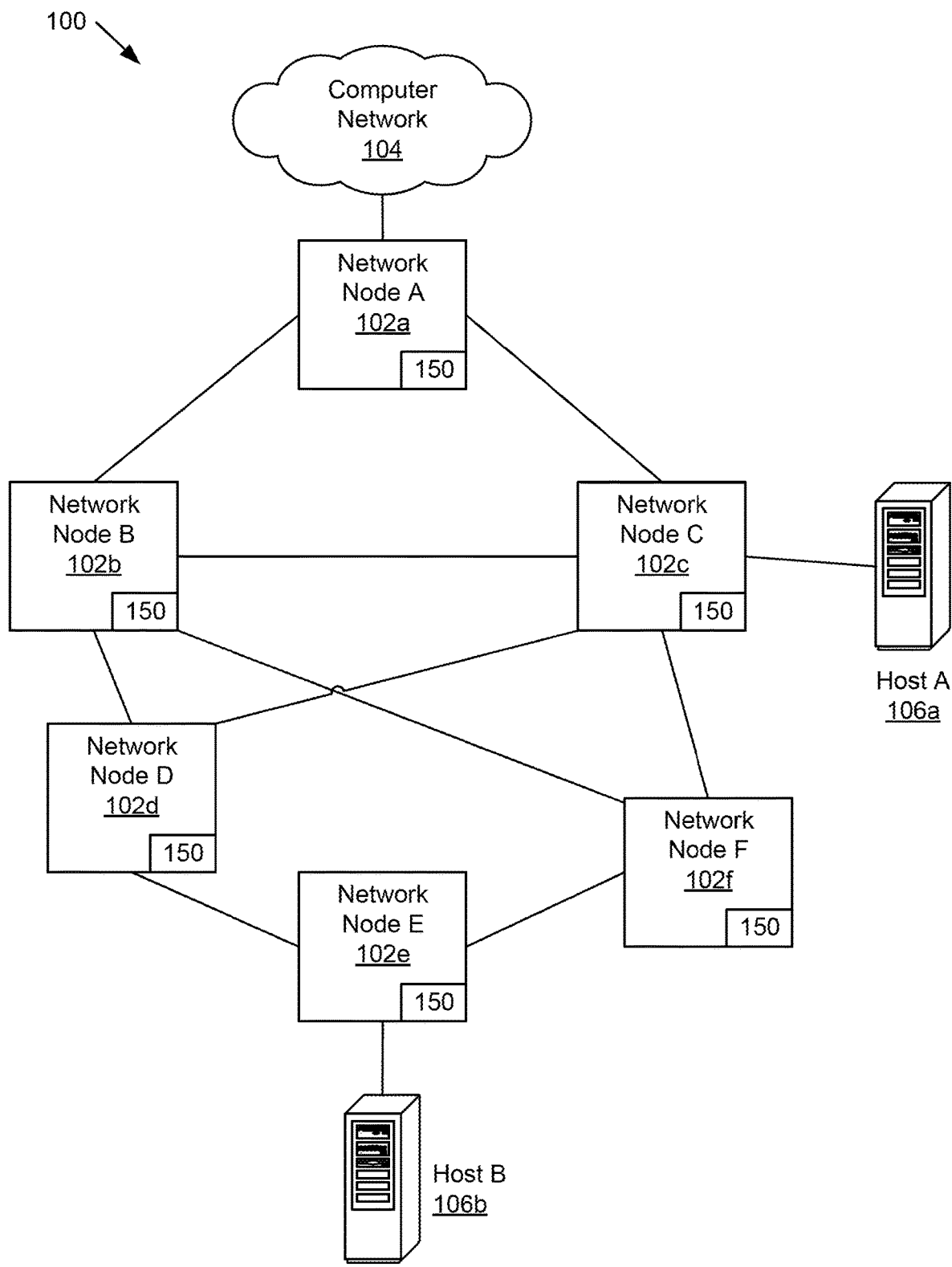
FIG. 1 is a schematic block diagram illustrating one embodiment of a data network for automatic maximum transmission unit ("MTU") configuration on a layer-2 domain.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for automatic MTU configuration is disclosed. Another apparatus and a method product also perform the functions of the apparatus. The apparatus includes an MTU message receiver circuit that is configured to receive, at a port of a network node, a message from a directly connected neighboring network node. The message includes an MTU of the neighboring network node where the network node and the neighboring network node are part of a data network of network nodes communicating using a layer-2 protocol. The apparatus includes an MTU comparison circuit that is configured to determine if the received MTU of the neighboring network node is larger than an MTU for the port, and an MTU approval circuit that, in response to the MTU comparison circuit determining that the received MTU is larger than the MTU for the port, is configured to determine if a size of the received MTU is supported by the network node. The method includes an MTU increase circuit that, in response to the MTU approval circuit determining that the received MTU is supported, is configured to change the MTU of the ports of the network node to match the received MTU, and an MTU message circuit that, in response to the MTU approval circuit determining that the received MTU is supported, is configured to send a message to network nodes connected to ports of the network node. The message includes the received MTU.

In some embodiments, in response to the MTU comparison circuit determining that the received MTU is equal to the MTU of the port, the MTU increase circuit maintains the MTU of the ports of the network node to match the received MTU and the apparatus includes an MTU acknowledgement circuit that is configured to send a message to a neighboring network node that the MTU is accepted. In other embodiments, the apparatus includes an MTU timer circuit that is configured to start an MTU timer for each port of the network node, except for the port that received the message with the received MTU, in response to the MTU approval circuit determining that the received MTU is supported.

In further embodiments, in response to the MTU comparison circuit determining that the received MTU is equal to the MTU of the port, the apparatus includes a stop timer circuit that is configured to stop an MTU timer for the port that received the message that includes the received MTU, and an MTU acknowledgement circuit that is configured to send a message to a neighboring network node that the MTU is accepted. In other further embodiments, in response to the MTU comparison circuit determining that the received MTU is smaller than the MTU of the port, the apparatus includes a timer running circuit that is configured to determine if an MTU timer is running for the port that received the message with the MTU, in response to the timer running circuit determining that the MTU timer for the port that received the MTU message is not running, the timer running circuit periodically checks MTU timers for a timeout status, and in response to the timer running circuit determining that the MTU timer for the port that received the MTU message is running, the apparatus includes a stop timer circuit that is configured to stop an MTU timer for the port that received the message that includes the received MTU, an MTU revert circuit that is configured to change the MTU for the ports of the network node to a previous MTU, and a corrective action circuit that is configured to take corrective action.

In other embodiments, in response to an MTU timer reaching an MTU timeout, the apparatus includes an MTU revert circuit that is configured to change the MTU for the ports of the network node to a previous MTU, and a corrective action circuit that is configured to take corrective action. In other embodiments, the apparatus includes a corrective action circuit that, in response to the MTU comparison circuit determining that a received MTU is smaller than the MTU of the port, is configured to take corrective action. In other embodiments, the apparatus includes a corrective action circuit that is configured to take corrective action in response to the MTU approval circuit determining that the received MTU is not supported. In other embodiments, the apparatus includes a periodic message circuit that is configured to, for each port of the network node, periodically send a message that includes the MTU of a port to a network node connected directly to the port. In other embodiments, network nodes in the data network use a link layer discovery protocol to send and receive messages regarding an MTU of the network nodes.

Another apparatus for automatic MTU configuration includes an MTU message receiver circuit that is configured to receive, at a port of a network node, a message from a directly connected neighboring network node. The message includes an MTU of the neighboring network node where the network node and the neighboring network node are part of a data network of network nodes communicating using a layer-2 protocol. The apparatus includes an MTU comparison circuit that is configured to determine if the received MTU of the neighboring network node is larger than an MTU for the port. The apparatus includes an MTU approval circuit that, in response to the MTU comparison circuit determining that the received MTU is larger than the MTU for the port, is configured to determine if a size of the received MTU is supported by the network node. In response to the MTU approval circuit determining that the received MTU is supported, the apparatus includes an MTU increase circuit that is configured to change the MTU of the ports of the network node to match the received MTU, an MTU timer circuit that is configured to start an MTU timer for each port of the network node, except for the port that received the message with the received MTU, and an MTU message circuit that is configured to send a message to network nodes connected to ports of the network node, the message includes the received MTU.

In some embodiments, in response to the MTU comparison circuit determining that the received MTU is equal to the MTU of the port, the apparatus includes a stop timer circuit that is configured to stop an MTU timer for the port that received the message that includes the received MTU, and an MTU acknowledgement circuit that is configured to send a message to a neighboring network node that the MTU is accepted.

In other embodiments, in response to the MTU comparison circuit determining that the received MTU is smaller than the MTU of the port, the apparatus includes a timer running circuit that determines if an MTU timer is running for the port that received the message with the MTU. In response to the MTU timer running circuit determining that the MTU timer for the port that received the MTU message is not running, the timer running circuit periodically checks MTU timers for a timeout status. In response to the timer running circuit determining that the MTU timer for the port that received the MTU message is running, the apparatus includes a stop timer circuit that is configured to stop an MTU timer for the port that received the message that includes the received MTU, an MTU revert circuit that is configured to change the MTU for the ports of the network node to a previous MTU, and a corrective action circuit that is configured to take corrective action.

In some embodiments, in response to an MTU timer reaching an MTU timeout, the apparatus includes an MTU revert circuit that is configured to change the MTU for the ports of the network node to a previous MTU, and a corrective action circuit that is configured to take corrective action. In other embodiments, the apparatus includes a corrective action circuit that is configured to take corrective action in response to the MTU approval circuit determining that the received MTU is not supported.

A method for automatic MTU configuration includes receiving, at a port of a network node, a message from a directly connected neighboring network node. The message includes an MTU of the neighboring network node where the network node and the neighboring network node are part of a data network of network nodes communicating using a layer-2 protocol. The method includes determining if the received MTU of the neighboring network node is larger than an MTU for the port. In response to determining that the received MTU is larger than the MTU for the port, the method includes determining if a size of the received MTU is supported by the network node. In response to determining that the received MTU is supported, the method includes changing the MTU of the ports of the network node to match the received MTU and sending a message to network nodes connected to ports of the network node, the message includes the received MTU. In response to determining that the received MTU is not supported, the method includes taking corrective action.

In some embodiments, the method includes starting an MTU timer for each port of the network node, except for the port that received the message with the received MTU, in response to determining that the received MTU is supported. In other embodiments, in response to determining that the received MTU is equal to the MTU of the port, the method includes stopping an MTU timer for the port that received the message that includes the received MTU, and sending a message to the neighboring network node that sent the received MTU that the MTU is accepted.

In other embodiments, in response to determining that the received MTU is smaller than the MTU of the port, the method includes determining if an MTU timer is running for the port that received the message with the MTU. In response to determining that the MTU timer for the port that received the MTU message is not running, the method includes periodically checking MTU timers for a timeout status. In response to determining that the MTU timer for the port that received the MTU message is running, the method includes stopping an MTU timer for the port that received the message that includes the received MTU, changing the MTU for the ports of the network node to a previous MTU, and taking corrective action. In other embodiments, in response to an MTU timer reaching an MTU timeout, the method includes changing the MTU for the ports of the network node to a previous MTU and taking corrective action.

FIG. 1 is a schematic block diagram illustrating one embodiment of a data network 100 for automatic maximum transmission unit ("MTU") configuration on a layer-2 domain. The data network 100 includes interconnected network nodes 102*a*-102*e* (collectively or generically "102") connected in at a layer 2 of the open systems interconnection ("OSI") model, each with an MTU change apparatus 150, a computer network 104, host A 106*a* and host B 106*b*, which are described below.

Network node A 102*a* is connected to another computer network 104, which may include the Internet. Network node C 102*c* is connected to host A 106*a* and network node E 102*e* is connected to host B 106*b*. The network nodes 102 are all connected as shown and the connections between some of the network nodes 102 include redundant links. In some embodiments, network nodes 102 use Spanning Tree Protocol ("STP"), which is a legacy networking protocol and is used to handle network redundancy at a layer-2 level of the OSI model. STP is widely employed due to its robustness and ease of use and also because of the interoperability with legacy networks. In other embodiments, the network nodes 102 use the Transparent Interconnection of Lots of Links ("TRILL") protocol. In other embodiments, the network nodes 102 use the Shortest Path Bridging ("SPB") protocol or similar versions, such as SPBV (Shortest Path Bridging VID where "VID" is video), or SPBM (Shortest Path Bridging MAC where MAC is Media Access Control). One of skill in the art will recognize other protocols that may be used in a data network 100 for automatic MTU configuration.

The data network 100 uses a neighboring protocol for communicating configuration information throughout the data network 100. For example, the neighboring protocol is used by a network node (e.g. network node A 102a) to transmit messages with MTU information to other connected network nodes 102 (e.g. network node B 102b and network node C 102c). in some embodiments, the neighboring protocol is Link Layer Discovery Protocol ("LLDP"), which is a vendor-neutral link layer protocol used by network devices, such as the network nodes 102, for advertising the identity, capabilities, and neighbors on a data network 100 based on IEEE 802 technology, for example wired Ethernet. In other embodiments, the neighboring protocol may include the Cisco Discovery Protocol, the Foundry Discovery Protocol, the Nortel Discovery Protocol, the Link Layer Topology Discovery, or the like.

The computer network 104 is a representation of a computer network external to the data network 100 connected by the network nodes 102. In one embodiment, the computer network 104 includes the Internet or other external network. The computer network 104 is merely representative of a destination or source of data packets being transmitted through the data network 100. The hosts 106 are also representative of destinations or sources of data packets. The hosts 106 are computing devices and may include a rack-mounted computer, a server, a desktop computer, a laptop computer, a mainframe computer, a cloud server, etc. The hosts 106 and computer network 104 may be replaced or switched with other computing devices and/or networks and merely represent sources and/or destinations of data packets being transmitted through the network nodes 102. While six network nodes 102 are depicted, other data networks include a different amount of network nodes 102 in various configurations and the embodiments described herein are applicable to the various configurations.

In some embodiments, some or all of the connections between network nodes 102 are wired connections or some other physical media, such as fiber optic cables. In other embodiments, some or all of the connections between network nodes 102 are wireless connections. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

In some embodiments, the data network 100 supports jumbo frames on the network nodes 102. In computer networking, data packets are sent with a header and a payload. Typical Ethernet frames are typically limited to a payload of 1500 byes, which is a limit set by the IEEE 802.3 standard. Typically, jumbo frames can carry payloads of up to 9000 bytes, but variations exist from vendor to vendor. In some embodiments, the data network 100 includes network nodes 102 with different MTUs, for example from different vendors. The embodiments described herein are beneficial in that they include automatic MTU configuration in a data network 100 with network nodes 102 with varying MTU capabilities.

The network nodes 102 each include an MTU change apparatus 150 that automatically updates an MTU in a network node 102 and advertise this MTU to connected network nodes 102 when the network node 102 receives a message with an MTU that is higher than a current MTU. The MTU change apparatus 150 also takes action if a received MTU is not supported and reverts back to a previous MTU under certain circumstances. The MTU change apparatus 150 is explained in more detail with respect to the apparatuses 200, 300 of FIGS. 2 and 3.

Figure 2:
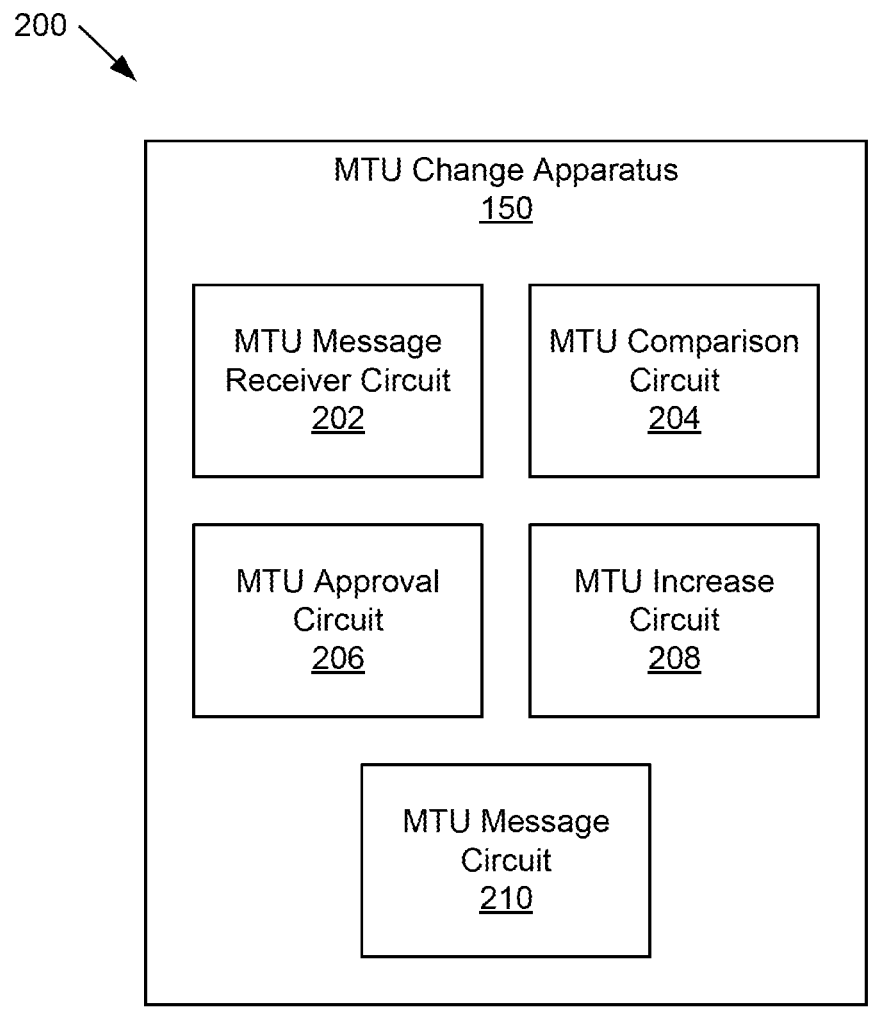
FIG. 2 is a schematic block diagram illustrating one embodiment of an apparatus for automatic MTU configuration on a layer-2 domain.
Figure 4:
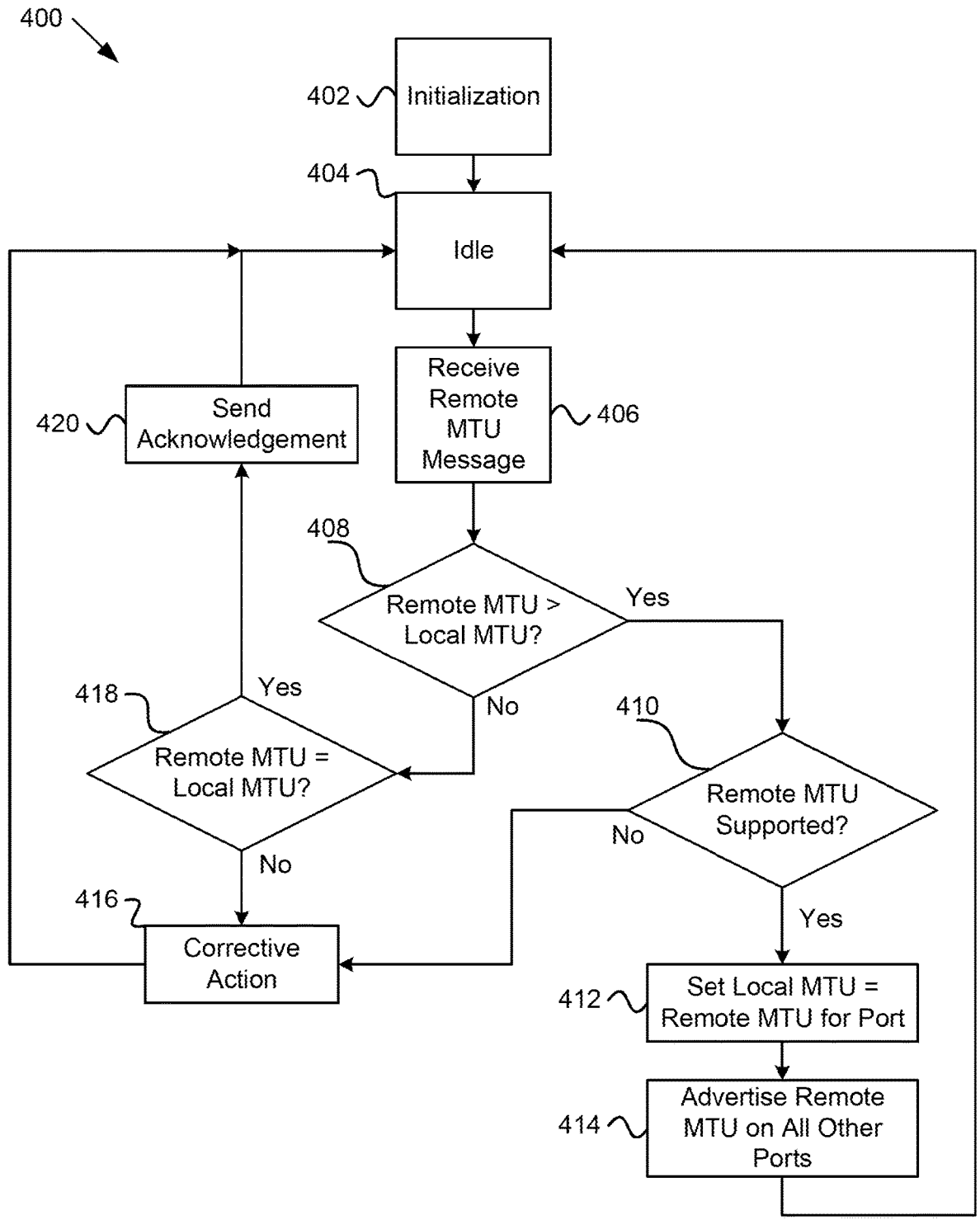
FIG. 4 is a schematic flow chart diagram illustrating one embodiment of a method for automatic MTU configuration on a layer-2 domain.
Figure 5:
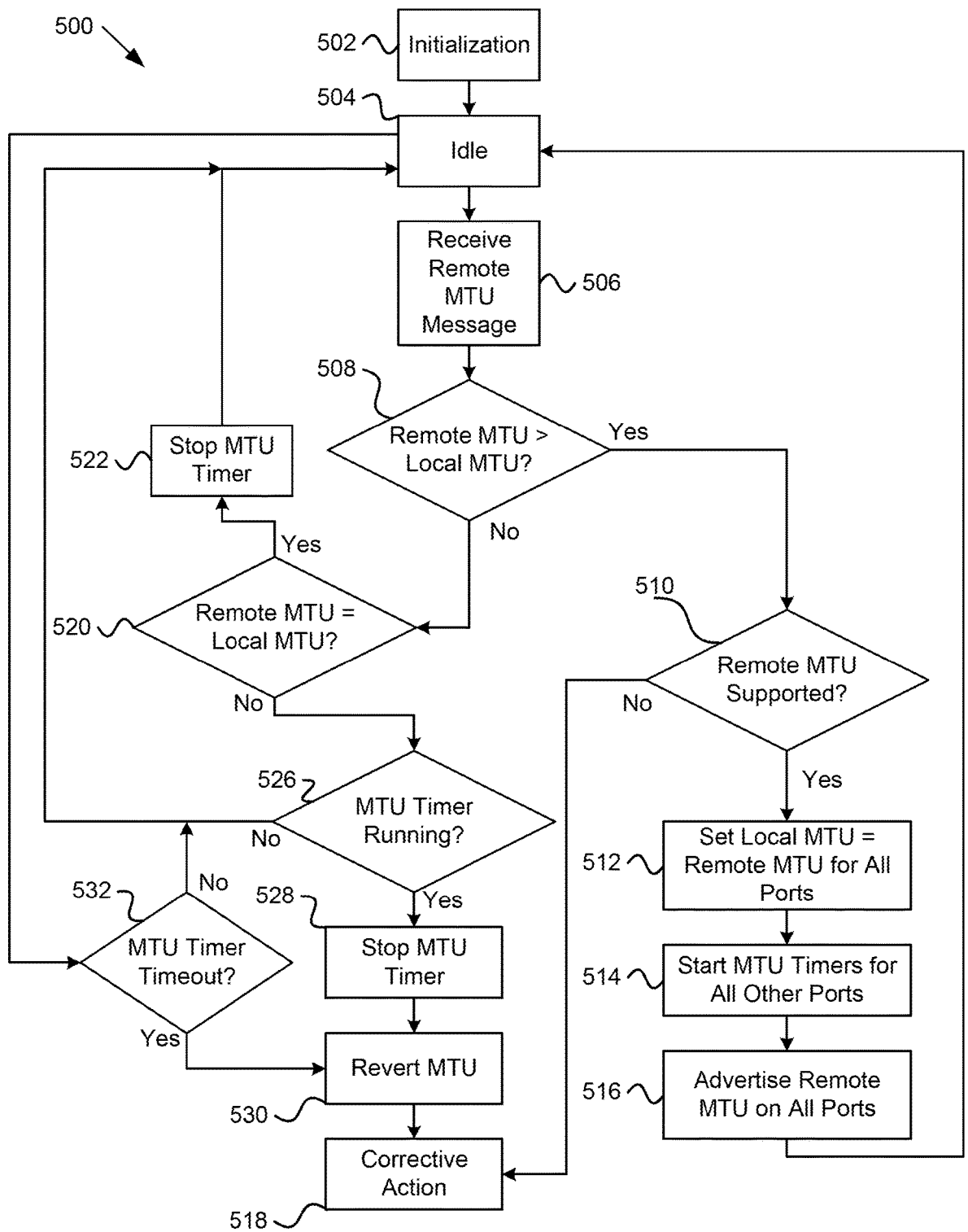
FIG. 5 is a schematic flow chart diagram illustrating one embodiment of a method for automatic MTU configuration on a layer-2 domain with timers.

FIG. 2 is a schematic block diagram illustrating one embodiment of an apparatus 200 for automatic MTU configuration on a layer-2 domain. The apparatus 200 includes one embodiment of an MTU change apparatus 150 with an MTU message receiver circuit 202, an MTU comparison circuit 204, an MTU approval circuit 206, an MTU increase circuit 208 and an MTU message circuit 210, which are described below. The MTU change apparatus 150, in some embodiments, is implemented with hardware circuits. In some examples, MTU change apparatus 150 is implemented as a state machine, as depicted in FIGS. 4 and 5. In other embodiments, the MTU change apparatus 150 is implemented using an application specific integrated circuit ("ASIC"). In other embodiments, the MTU change apparatus 150 is implemented with a programmable hardware device, such as a field programmable gate array ("FPGA"), programmable array logic ("PAL"), and the like. In some embodiments, the MTU change apparatus 150 is implemented with program code to be executed on a processor of a network node 102, which may be a processor customized for switches, routers, etc.

The apparatus 200 includes an MTU message receiver circuit 202 that is configured to receive, at a port of a network node (e.g. 102c), a message from a directly connected neighboring network node (e.g. 102a). The message includes an MTU of the neighboring network node 102a where the network node 102c and the neighboring network node 102a are part of a data network 100 of network nodes 102a-e communicating using a layer-2 protocol.

The network nodes 102 include ingress ports for incoming data packets and egress ports for outgoing data packets. In addition, data packets may flow on links between particular network nodes 102 for a particular data path while other links between network nodes 102 may be redundant links where data packets may be dropped. Control messages typically are transmitted between network nodes 102 regardless of whether or not a particular link is a redundant link. For example, a message from network node A 102a may be transmitted to network node B 102b, network node D 102d, and network node F 102f even if the link between network node C 102c and network node D 102d is a redundant link.

The data network 100 includes a neighboring protocol so that each network node 102 communicates with a directly connected network node 102. For example, network node C 102c communicates with network nodes A, B, D and F 102a, 102b, 102d, 102f and not with network node E 102e. However, certain messages are propagated past a directly connected network node 102. The message received by the MTU receiver circuit 212 receives a message that includes the MTU of the network node 102 that sent the message. For example, the MTU may be included in a particular field of a header or in the payload of the received message. In an example, network node C 102c receives a message from network node A 102a that includes the MTU of network node A 102a.

The apparatus 200 includes an MTU comparison circuit 204 that is configured to determine if the received MTU of the neighboring network node 102 is larger than an MTU for the port. For example, the MTU change apparatus 150 may be in network node C 102c and the MTU message receiver circuit 202 receives the message with the MTU of network node A 102a from network node A 102a. The MTU of the ingress port of network node C 102c connected to network node A 102a may be stored in a register of the ingress port. The MTU comparison circuit 204 may then compare the MTU stored in the register of the ingress port with the received MTU to determine if the received MTU is larger than the MTU of the ingress node of network node C 102c. In one example, the received MTU from network node A 102a may be 8500 and a current MTU of the ingress port in network node C 102c is set to 8000. The MTU comparison circuit 204 then determines that the received MTU is higher than the current MTU of the ingress port in network node C 102c.

The apparatus 200 includes an MTU approval circuit 206 that, in response to the MTU comparison circuit 204 determining that the received MTU is larger than the MTU for the port, is configured to determine if a size of the received MTU is supported by the network node 102. For example, if network node C 102c is capable of handling data packets with a payload of 9000 bytes, network node C 102c may store a value of 9000 in read only memory ("ROM"), flash memory, or other persistent memory along with other configuration data of network node C 102c. If the received MTU in the message received by the MTU message receiver circuit 202 is 8500, then the MTU approval circuit 206 may then read the stored maximum MTU from the ROM and compare the received MTU with the stored MTU of 9000 to determine that the received MTU is supported by network node C 102c. However, if network node C 102c is capable of handling data packets with a payload of only 8000 bytes, the MTU approval circuit 206 determines that the received MTU of 8500 is not supported by network node C 102c.

The apparatus 200 includes an MTU increase circuit 208 that, in response to the MTU approval circuit 206 determining that the received MTU is supported, is configured to change the MTU of the ports of the network node 102 to match the received MTU. For example, if the received MTU is 8500 and a current MTU for the port in the network node 102 is 8000 and the MTU approval circuit 206 determines that the received MTU is supported, the MTU increase circuit 208 increases the MTU for the ports of the network node 102. For example, the MTU increase circuit 208 in network node C 102c may increase the MTU of the ports of network node C 102c by writing the received MTU of 8500 into a register of each port of network node C 102c that stores the MTU of the port.

The apparatus 200 includes an MTU message circuit 210 that, in response to the MTU approval circuit 206 determining that the received MTU is supported, is configured to send a message to network nodes 102 connected to ports of the network node 102. The message includes the received MTU. For example, if the MTU approval circuit 206 of network node C 102c determines that a received MTU of 8500 is supported, the MTU message circuit 210 of network node C 102c sends a message that includes the received MTU to directly connected network nodes B, D and F 102b, 102d, 102f. The MTU message circuit 210 uses a neighboring protocol to transmit the message with the MTU, such as LLDP. Once network nodes B, D and F 102b, 102d, 102f receive the message, the MTU change apparatus 150 in each of network nodes B, D and F 102b, 102d, 102f act to compare the received MTU with a current MTU, determine if the received MTU is supported, etc.

In some embodiments, the MTU message circuit 210 in network node C 102c sends a message back to network node A 102a that includes the received MTU. In some embodiments, the MTU message circuit 210 in network node C 102c sends a message back to network node A 102a that includes the received MTU after receiving a response from the directly connected network nodes B, D and F 102b, 102d, 102f that the MTU sent by the MTU message circuit 210 has been accepted by each directly connected network node 102b, 102d, 102f. In this case, the message sent back to network node A 102a is an acknowledgement message, which signals to network node A 102a that network node C 102c has accepted the MTU sent by network node A 102a.

Figure 3:
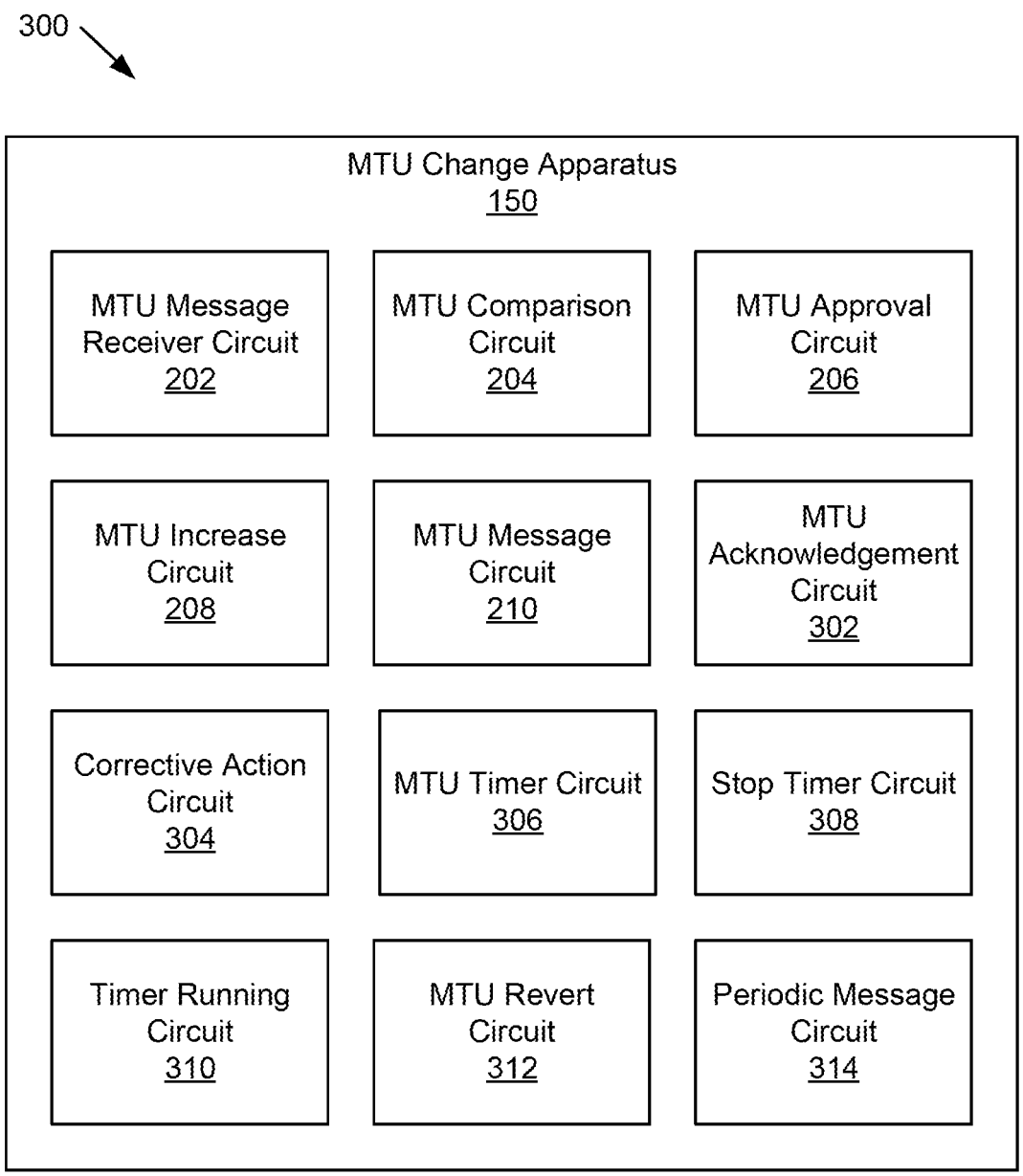
FIG. 3 is a schematic block diagram illustrating another embodiment of an apparatus for automatic MTU configuration on a layer-2 domain.

FIG. 3 is a schematic block diagram illustrating another embodiment of an apparatus 300 for automatic MTU configuration on a layer-2 domain. The apparatus 300 includes another embodiment of the MTU change apparatus 150 that includes an MTU message receiver circuit 202, an MTU comparison circuit 204, an MTU approval circuit 206, an MTU increase circuit 208 and an MTU message circuit 210, which are substantially similar to those described above in relation to the apparatus 200 of FIG. 2. In various embodiments, the apparatus 300 includes an MTU acknowledgement circuit 302, a corrective action circuit 304, an MTU timer circuit 306, a stop timer circuit 308, a timer running circuit 310, an MTU revert circuit 312 and/or a periodic message circuit 314, which are described below. The MTU change apparatus 150 of the apparatus 300 of FIG. 3 may be implemented in similar ways to the MTU change apparatus 150 of the apparatus 200 of FIG. 2.

The apparatus 300 includes, in some embodiments, an MTU acknowledgement circuit 302 that, in response to the MTU comparison circuit 204 determining that the received MTU is equal to the MTU of the port, is configured to send a message to a neighboring network node 102 that the MTU is accepted. In addition, in response to the MTU comparison circuit 204 determining that the received MTU is equal to the MTU of the port, the MTU increase circuit 208 maintains the MTU of the ports of the network node 102 to match the received MTU. In some embodiments, the MTU acknowledgement circuit 302 sends the message with the accepted MTU to connected network nodes 102 periodically in conjunction with the periodic message circuit 314 described below. In other optional embodiments, the MTU acknowledgement circuit 302 sends an acknowledgement message with the accepted MTU to the network node 102 that sent the message MTU that was compared by the MTU comparison circuit 204 and determined to be equal to the MTU of the port that received the message. In this embodiment, the MTU acknowledgement circuit 302 speeds up the MTU acceptance process.

For example, network node C 102c may receive a message from network node A 102a with a received MTU of 8500 and network node C 102c may already have an MTU of 8500. In this situation, the MTU of network node C 102c is the same as the received MTU from network node C 102c so that the MTU increase circuit 208 maintains the MTU of network node C 102c at 8500. In addition, the MTU acknowledgement circuit 302 of network node C 102c sends a message back to network node A 102a that the MTU is accepted. In some embodiments, the message includes an acceptance. In other embodiments, the message includes an MTU which is the same as the received MTU and the upstream network node A 102a recognizes that the MTU is accepted by network node C 102c.

The apparatus 300 includes, in some embodiments, a corrective action circuit 304 that, in response to the MTU comparison circuit 204 determining that a received MTU is smaller than the MTU of the port, is configured to take corrective action. In one embodiment, the corrective action circuit 304 sends an MTU mismatch message. The MTU mismatch message, in some embodiments, is an alarm, an alert, or the like. For example, the MTU mismatch message may be of the type that propagates through the data network 100 to a host 106 or through the computer network 104 to a system administrator. The system administrator may then take corrective action, such as manually assigning an MTU to one or more network nodes 102 of the data network 100. In other embodiments, the corrective action circuit 304 may trigger other actions, such as shutting down a port that received an MTU with a lower value than the MTU of the port, causing the network nodes 102 to change to a default MTU, and the like. One of skill in the art will recognize other ways that the corrective action circuit 304 may take corrective action and/or send an MTU mismatch message that triggers corrective action.

For example, the MTU message circuit 210 may send an MTU of 8500 to connected network nodes B, D and F 102b, 102d, 102f and network node B 102b may not support an MTU of 8500. Network node C 102c may then receive a message from network node B 102b that includes an MTU of 8000, which is the MTU that network node B 102b supports and is set to. The corrective action circuit 304 then takes for corrective action, which may include sending an MTU mismatch message. In one embodiment, the MTU mismatch message includes the received MTU of 8000, which may be used by a system administrator or by MTU change apparatuses 150 to take corrective action, such as reverting MTUs back to 8000. In other embodiments, the corrective action circuit 304 shuts down the port in network node C 102c connected to network node B 102b.

In some embodiments, in response to the MTU approval circuit 206 determining that the received MTU is not supported, the corrective action circuit 304 takes corrective action. For example, if the MTU message receiver circuit 202 of network node C 102c receives a message from network node A 102a that includes a received MTU of 8500 and the MTU approval circuit 206 determines that the received MTU of 8500 is not supported. The corrective action circuit 304 then takes corrective action.

In some embodiments, the MTU change apparatus 150 includes timers that take certain actions to reset timers and to take other actions in situations where a timer reaches a timeout. In the embodiments, the apparatus 300 includes an MTU timer circuit 306 that is configured to start an MTU timer for each port of the network node 102, except for the port that received the message with the received MTU, in response to the MTU approval circuit 206 determining that the received MTU is supported. In the embodiment, the MTU increase circuit 208 increases the MTU for the ports of the network node 102 and the MTU message circuit 210 sends a message to the directly connected network nodes 102 that includes the received MTU.

For example, if the MTU message receiver circuit 202 receives a message from network node A 102a with an MTU of 8500 and the MTU comparison circuit 204 determines that the received MTU of 8500 is greater than a current MTU of 8000, and then the MTU approval circuit 206 determines that the received MTU of 8500 is supported, the MTU timer circuit 306 sets an MTU timer for the ports connected to network node B 102b, network node D 102d and network node F 102f The MTU increase circuit 208 sets the MTU for the ports connected to network node B 102b, network node D 102d and network node F 102f to 8500 and the MTU message circuit 210 sends a message to network node B 102b, network node D 102d and network node F 102f that includes an MTU of 8500.

The apparatus 300 includes a stop timer circuit 308 that, in response to the MTU comparison circuit 204 determining that the received MTU is equal to the MTU of the port, is configured to stop an MTU timer for the port that received the message comprising the received MTU. In the embodiment, the port connected to network node B 102b may eventually receive a message from network node B 102b with an MTU of 8500 indicating that network node B 102b supports and has accepted an MTU of 8500. The stop timer circuit 308 stops the MTU timer for the port connected to network node B 102b.

In the embodiment, the apparatus 300 also includes an MTU acknowledgement circuit 302 that, in response to the MTU comparison circuit 204 determining that the received MTU is equal to the MTU of the port, is configured to send a message to a neighboring network node 102 that the MTU is accepted. For example, where the MTU comparison circuit 204 determines that an MTU received from network node B 102b is the same as the MTU for the port connected to network node B 102b, the MTU acknowledgement circuit 302 may send a message back to network node A 102a that indicates that network node C 102c has accepted the MTU originally sent from network node A 102a. In other embodiments, the MTU acknowledgement circuit 302 waits until all ports connected to directly connected network nodes 102 (e.g. network node B 102b, network node D 102d and network node F 102f) send back an MTU matching the MTU of the ports (e.g. all send an MTU of 8500) before sending an acknowledgement message back to network node A 102a that network node C 102c has accepted the MTU sent originally by network node A 102a.

In some instances, the MTU comparison circuit 204 determines that the received MTU is smaller than the MTU of the port. In the embodiment, the apparatus 300 includes a timer running circuit 310 that is configured to determine if an MTU timer is running for the port that received the message with the MTU. For example, where the MTU timer circuit 306 started an MTU timer for a port in network node C 102c connected to network node B 102b in conjunction with the MTU message circuit 210 sending out a message with the MTU of the port of 8500 to network node B 102b, network node B 102b may not support an MTU of 8500 and may send back a lower MTU, such as 8000. The MTU comparison circuit 204 compares the MTU of the port of 8500 with the received MTU of 8000 from network node B 102b and determines that this received MTU is lower than the MTU of the port. The timer running circuit 310 then determines if there is an MTU timer running for the port connected to network node B 102b, which in this case would be true.

In response to the timer running circuit 310 determining that the MTU timer for the port that received the MTU message is running, the stop timer circuit 308 is configured to stop an MTU timer for the port that received the message that includes the received MTU. In addition, the apparatus 300 optionally includes an MTU revert circuit 312 that is configured to change the MTU for the ports of the network node 102 to a previous MTU and the corrective action circuit 304 is configured to take corrective action. In other embodiments, corrective action changes the MTU for the ports of the network node 102 to a certain value. The corrective action may be by a system administrator, by a computing device, etc. Continuing with the example above, network node C 102c may receive a message from network node B 102b that includes a received MTU of 8000, which is lower than the MTU of 8500 of the port in network node C 102c connected to network node B 102b. After the MTU comparison circuit 204 determines that this received MTU of 8000 is lower than the port MTU of 8500, the stop timer circuit 308 stops the MTU timer of the port connected to network node B 102b, the MTU revert circuit 312 may change the MTU for the ports of network node C 102c to a previous MTU, such as 8000, and the corrective action circuit 304 takes corrective action, which may include sending an MTU mismatch message, which may be used to trigger corrective action.

In some embodiments, the apparatus 300 includes a periodic message circuit 314 that is configured to, for each port of the network node 102, periodically send a message that includes the MTU of a port to a network node 102 connected directly to the port. The periodic message circuit 314 may be used to verify that MTUs of various ports of various network nodes 102 match and that that an MTU of a particular network node 102 has not been changed, for example by a system administrator.

FIG. 4 is a schematic flow chart diagram illustrating one embodiment of a method 400 for automatic MTU configuration on a layer-2 domain. The method 400 is for an automatic MTU configuration without timers. The method 400 of FIG. 4, in some embodiments, is implemented with a state machine. A state machine is one way to implement the apparatuses 200, 300 of FIGS. 2 and 3.

The method 400 is for a data network 100 with network nodes 102 in a layer-2 domain. The method 400 begins at initialization 402 an then enters an idle state 404 and the method 400 waits for a message from a directly connected neighboring network node 102 that includes an MTU. The method 400 receives 406, at a port of the network node 102 (e.g. 102c), a message from a directly connected neighboring network node 102 (e.g. 102a) and determines 408 if the received MTU of the neighboring network node 102 is larger than an MTU for the port. For example, if network node A 102a sends a message with an MTU of 8500, the method 400 determines 408 if the received MTU of 8500 is greater than an MTU of the port, which may be 8000.

If the method 400 determines 408 that the received MTU is larger than the MTU for the port, the method 400 determines 410 if a size of the received MTU is supported by the network node 102. Continuing with the example, network node B 102b may support payloads up to 9000 bytes so the method 400 determines 410 that the received MTU of 8500 is supported. In response to the method 400 determining 410 that the received MTU is supported by the network node 102, the method 400 changes 412 the MTU for the port of the network node 102 that received the MTU message to match the received MTU. Continuing with the example, network node C 102c changes 412 the MTU for all of the port of network node C 102c connected to network node A 102a to 8500.

Also, in response to the method 400 determining 410 that the received MTU is supported by the network node 102, the method 400 sends 414 a message to network nodes 102 connected to ports of the network node 102 other than the port that received the message with the received MTU. The message includes the received MTU, and the method 400 returns to an idle state 404 to wait for messages from a network node 102. Continuing with the example above, network node C 102c sends a message with an MTU of 8500 to network node B 102b, network node D 102d and network node F 102f, which are connected to ports of network node C 102c. The method 400 then returns to an idle state 404 and waits for a response from a connected network node 102 (e.g. 102b, 102d, 102f).

If the method 400 receives 406 a message with an MTU and determines 408 that the received MTU is greater than the MTU of a port that received the message but determines 410 that the received MTU is not supported, the method 400 takes 416 corrective action. Continuing with the example above, if network node C 102c receives 406 a message from network node A 102a with a received MTU of 8500 but the method 400 determines 410 that network node C 102c can only support an MTU of 8000, the method 400 takes 416 corrective action, and returns to an idle state 404.

The method 400 again receives 406 a message with an MTU and first determines 408 if the received MTU is greater than the MTU of a port that received the message and, if the method 400 determines 408 that the received MTU is not greater than the MTU of the port, the method 400 determines 418 if the received MTU is equal to the MTU of the port that received the message. If the method 400 determines 410 that that the received MTU is equal to the MTU of the port, the method 400 maintains the MTU of the ports of the network node 102 at a same current value and sends 420 a message to a neighboring network node 102 that the MTU is accepted.

Continuing with the example above, if the method 400 receives 406 a message with an MTU of 8500 from network node D 102d and determines 408 that the received MTU of 8500 is not greater than the MTU of 8500 of the port connected to network node D 102d, the method 400 determines 418 that the received MTU of 8500 is equal to the MTU of 8500 of the port connected to network node D 102d, which indicates that network node D 102d has accepted the sent MTU of 8500, the method 400 maintains the MTU of network node C 102c at 8500 and sends a message to network node A 102a that the MTU of 8500 is accepted. In some embodiments, the method 400 waits until network node B 102b, network node D 102d, and network node F 102f have all sent messages back that include a received MTU of 8500 before sending 420 the acknowledge message back to network node A 102*a* that network node C 102*c* has accepted the MTU of 8500.

If the method 400 determines 408 that a received MTU is not greater than the MTU of the port that received the message with the MTU and determines 418 that the received MTU is not greater than the MTU of the port that received the message with the MTU, which means that the received MTU is less than the MTU of the port, the method 400 takes 416 corrective action, which may include taking corrective action and/or changes the MTU for the ports of the network node 102 to a previous MTU. Continuing again with the example above, if network node C 102*c* receives a message on the port connected to network node B 102*b* that includes an MTU of 8000 when the MTU of network node C 102*c* is set to 8500, the method 400 takes 416 corrective action and may also revert the MTU for the ports of network node C 102*c* to a previous value, for example, 8000.

In various embodiments, the method 400 may be implemented with the MTU message receiver circuit 202, the MTU comparison circuit 204, the MTU approval circuit 206, the MTU increase circuit 208, the MTU message circuit 210, the MTU acknowledgement circuit 302, the corrective action circuit 304, the MTU revert circuit 312 and/or the periodic message circuit 314.

FIG. 5 is a schematic flow chart diagram illustrating one embodiment of a method 500 for automatic MTU configuration on a layer-2 domain with timers. The method 500 of FIG. 5, in some embodiments, is implemented with a state machine. A state machine is one way to implement the apparatus 300 of FIG. 3.

The method 500 is for a data network 100 with network nodes 102 in a layer-2 domain. The method 500 begins at initialization 502 an then enters an idle state 504 and the method 500 waits for a message from a directly connected neighboring network node 102 that includes an MTU. The method 500 receives 506, at a port of the network node 102 (e.g. 102*c*), a message from a directly connected neighboring network node 102 (e.g. 102*a*) and determines 508 if the received MTU of the neighboring network node 102 is larger than an MTU for the port. For example, if network node A 102*a* sends a message with an MTU of 8500, the method 500 determines 508 if the received MTU of 8500 is greater than an MTU of the port, which may be 8000.

If the method 500 determines 508 that the received MTU is larger than the MTU for the port, the method 500 determines 510 if a size of the received MTU is supported by the network node 102. Continuing with the example, network node B 102*b* may support payloads up to 9000 bytes so the method 500 determines 510 that the received MTU of 8500 is supported. In response to the method 500 determining 510 that the received MTU is supported by the network node 102, the method 500 changes 512 the MTU for the ports of the network node 102 to match the received MTU. Continuing with the example, network node C 102*c* changes 512 the MTU for all of the ports of network node C 102*c* to 8500.

Also, in response to the method 500 determining 510 that the received MTU is supported by the network node 102, the method 500 starts 514 MTU timers for each port of the network node 102 other than the port that received 506 the message with the received MTU and sends 516 a message to network nodes 102 connected to ports of the network node 102 where the message includes the received MTU, and the method 500 returns to the idle state 504 to wait for messages from a network node 102. Continuing with the example above, network node C 102*c* starts 514 an MTU timer for the ports connected to network node B 102*b*, network node D 102*d*, and network node F 102*f* and sends 516 a message with an MTU of 8500 to network node A 102*a*, network node B 102*b*, network node D 102*d* and network node F 102*f*, which are connected to ports of network node C 102*c*. For example, the method 500 may periodically send the MTU of network node C 102*c* to connected network nodes A, B, D, and F 102*a*, 102*b*, 102*d*, 102*f*, for instance from the idle state 504. The method 500 then returns to the idle state 504 and waits for a response from a connected network node 102 (e.g. 102*b*, 102*d*, 102*f*).

If the method 500 receives 506 a message with an MTU and determines 508 that the received MTU is greater than the MTU of a port that received the message but determines 510 that the received MTU is not supported, the method 500 takes 518 corrective action. Continuing with the example above, if network node C 102*c* receives 506 a message from network node A 102*a* with a received MTU of 8500 but the method 500 determines 510 that network node C 102*c* can only support an MTU of 8000, the method 500 takes 518 corrective action and returns to the idle state 504.

The method 500 again receives 506 a message with an MTU and first determines 508 if the received MTU is greater than the MTU of a port that received the message and, if the method 500 determines 508 that the received MTU is not greater than the MTU of the port, the method 500 determines 520 if the received MTU is equal to the MTU of the port that received the message. If the method 500 determines 510 that that the received MTU is equal to the MTU of the port, the method 500 maintains the MTU of the ports of the network node 102 at a same current value, stops 522 the MTU timer for the port that received the message.

Continuing with the example above, if the method 500 receives 506 a message with an MTU of 8500 from network node D 102*d* and determines 508 that the received MTU of 8500 is not greater than the MTU of the port of 8500 and determines 520 that the received MTU is equal to the MTU of the port, the method 500 maintains the MTU of network node C 102*c* at 8500, stops 522 the MTU timer of the port connected to network node D 102*d*. Optionally, where the data network 100 is using a neighboring protocol, such as LLDP, each network node 102 periodically sends a message to connected network nodes 102 that includes the MTU of the sending network node 102, so network node C 102*c* sending a message may be useful to speed up acceptance of an MTU.

If the method 500 determines 508 that a received MTU is not greater than the MTU of the port that received the message with the MTU and determines 520 that the received MTU is not greater than the MTU of the port that received the message with the MTU, which means that the received MTU is less than the MTU of the port, the method 500 determines 526 if the MTU timer for the port that received the message with the MTU is running. If the method 500 determines that the MTU timer is not running, the method 500 returns to the idle state 504. If the method 500 determines 526 that the MTU timer is running, the method 500 stops 528 the MTU timer for the port that received the message, optionally reverts 530 the MTU of the ports of the network node 102 back to a previous MTU, and takes 518 corrective action.

Continuing again with the example above, if network node C 102*c* receives a message on the port connected to network node B 102*b* that includes an MTU of 8000 after network node C 102*c* sent 516 a message with an MTU of 8500 to network node B 102*b* and started 514 an MTU timer for the port, the method 500 determines 526 that the MTU timer is running for the port connected to network node B 102*b*, stops the MTU timer, optionally reverts 530 the MTU of the ports of network node C 102*c* back to a previous value, for example, 8000, and takes 518 corrective action.

The method 500, from the idle state 504 also determines 532 if an MTU timer has timed out. For example, in the idle state 504, the method 500 periodically checks to see if MTU timers have timed out, which indicates that an MTU has not been accepted. If the method 500 determines 532 that an MTU timer has timed out, the method 500 takes 518 corrective action.

In various embodiments, the method 500 may be implemented with the MTU message receiver circuit 202, the MTU comparison circuit 204, the MTU approval circuit 206, the MTU increase circuit 208, the MTU message circuit 210, the MTU acknowledgement circuit 302, the corrective action circuit 304, the MTU timer circuit 306, the stop timer circuit 308, the timer running circuit 310, the MTU revert circuit 312 and/or the periodic message circuit 314.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
A maximum transmission unit ("MTU") message receiver circuit configured to receive, at a port of a network node, a message from a directly connected neighboring network node, the message comprising a MTU of the neighboring network node, wherein the network node and the neighboring network node are part of a data network of network nodes communicating using a layer-2 protocol;
an MTU comparison circuit configured to compare the received MTU of the neighboring network node with an MTU for the port;
an MTU approval circuit configured to, in response to the MTU comparison circuit determining that the received MTU is larger than the MTU for the port, compare the received MTU with a maximum MTU supported by the network node; and
an MTU increase circuit configured to, in response to the MTU approval circuit determining that the received MTU is supported, change the MTU of the ports of the network node to match the received MTU.

2. The apparatus of claim 1, wherein in response to the MTU comparison circuit determining that the received MTU is equal to the MTU of the port:
the MTU increase circuit is configured to maintain the MTU of the ports of the network node to match the received MTU; and
further comprising an MTU acknowledgement circuit configured to send a message to a neighboring network node that the MTU is accepted.

3. The apparatus of claim 1, further comprising an MTU timer circuit configured to start an MTU timer for each port of the network node, except for the port that received the message with the received MTU, in response to the MTU approval circuit determining that the received MTU is supported.

4. The apparatus of claim 3, in response to the MTU comparison circuit determining that the received MTU is equal to the MTU of the port, further comprising:

a stop timer circuit configured to stop an MTU timer for the port that received the message comprising the received MTU; and
an MTU acknowledgement circuit configured to send a message to a neighboring network node that the MTU is accepted.

5. The apparatus of claim 3, in response to the MTU comparison circuit determining that the received MTU is smaller than the MTU of the port, further comprising:
a timer running circuit configured to determine a status of an MTU timer of the port that received the message with the MTU;
in response to the timer running circuit determining that the MTU timer for the port that received the MTU message is not running, the timer running circuit periodically checks MTU timers for a timeout status; and
in response to the timer running circuit determining that the MTU timer for the port that received the MTU message is running, further comprising:
a stop timer circuit configured to stop an MTU timer for the port that received the message comprising the received MTU;
an MTU revert circuit configured to change the MTU for the ports of the network node to a previous MTU; and
a corrective action circuit configured to take corrective action.

6. The apparatus of claim 3, in response to an MTU timer reaching an MTU timeout, further comprising:
an MTU revert circuit configured to change the MTU for the ports of the network node to a previous MTU; and
a corrective action circuit configured to take corrective action.

7. The apparatus of claim 1, further comprising a corrective action circuit configured to, in response to the MTU comparison circuit determining that a received MTU is smaller than the MTU of the port, to take corrective action.

8. The apparatus of claim 1, further comprising a corrective action circuit configured to take corrective action in response to the MTU approval circuit determining that the received MTU is not supported.

9. The apparatus of claim 1, further comprising a periodic message circuit configured to, for each port of the network node, periodically send a message comprising the MTU of a port to a network node connected directly to the port.

10. An apparatus comprising:
A maximum transmission unit ("MTU") message receiver circuit configured to receive, at a port of a network node, a message from a directly connected neighboring network node, the message comprising a MTU of the neighboring network node, wherein the network node and the neighboring network node are part of a data network of network nodes communicating using a layer-2 protocol;
an MTU comparison circuit configured to compare the received MTU of the neighboring network node with an MTU for the port; and
an MTU approval circuit configured to, in response to the MTU comparison circuit determining that the received MTU is larger than the MTU for the port, compare the received MTU with a maximum MTU supported by the network node,
in response to the MTU approval circuit determining that the received MTU is supported:
an MTU increase circuit is configured to change the MTU of the ports of the network node to match the received MTU;

an MTU timer circuit is configured to start an MTU timer for each port of the network node, except for the port that received the message with the received MTU; and an MTU message circuit is configured to send a message to network nodes connected to ports of the network node, the message comprising the received MTU.

11. The apparatus of claim 10, in response to the MTU comparison circuit determining that the received MTU is equal to the MTU of the port, further comprising:

a stop timer circuit configured to stop an MTU timer for the port that received the message comprising the received MTU; and an MTU acknowledgement circuit configured to send a message to a neighboring network node that the MTU is accepted.

12. The apparatus of claim 10, in response to the MTU comparison circuit determining that the received MTU is smaller than the MTU of the port, further comprising:

a timer running circuit configured to determine a status of an MTU timer of the port that received the message with the MTU;

in response to the MTU timer running circuit determining that the MTU timer for the port that received the MTU message is not running, the timer running circuit is configured to periodically check MTU timers for a timeout status; and in response to the timer running circuit determining that the MTU timer for the port that received the MTU message is running, further comprising:

a stop timer circuit configured to stop an MTU timer for the port that received the message comprising the received MTU;

an MTU revert circuit configured to change the MTU for the ports of the network node to a previous MTU; and a corrective action circuit configured to take corrective action.

13. The apparatus of claim 10, in response to an MTU timer reaching an MTU timeout, further comprising:

an MTU revert circuit configured to change the MTU for the ports of the network node to a previous MTU; and a corrective action circuit configured to take corrective action.

14. The apparatus of claim 10, further comprising a corrective action circuit configured to take corrective action in response to the MTU approval circuit determining that the received MTU is not supported.

15. A method comprising:

receiving, at a port of a network node, a message from a directly connected neighboring network node, the message comprising a maximum transmission unit ("MTU") of the neighboring network node, wherein the network node and the neighboring network node are part of a data network of network nodes communicating using a layer-2 protocol;

comparing the received MTU of the neighboring network node with an MTU for the port;

in response to determining that the received MTU is larger than the MTU for the port, comparing the received MTU with a maximum MTU supported by the network node;

in response to determining that the received MTU is supported:

changing the MTU of the ports of the network node to match the received MTU; and sending a message to network nodes connected to ports of the network node, the message comprising the received MTU; and in response to determining that the received MTU is not supported, taking corrective action.

16. The method of claim 15, further comprising starting an MTU timer for each port of the network node, except for the port that received the message with the received MTU, in response to determining that the received MTU is supported.

17. The method of claim 16, in response to determining that the received MTU is equal to the MTU of the port, further comprising:

stopping an MTU timer for the port that received the message comprising the received MTU; and sending a message to the neighboring network node that sent the received MTU that the MTU is accepted.

18. The method of claim 16, in response to determining that the received MTU is smaller than the MTU of the port, further comprising:

determining a status of an MTU timer of the port that received the message with the MTU;

in response to determining that the MTU timer for the port that received the MTU message is not running, periodically checking MTU timers for a timeout status; and in response to determining that the MTU timer for the port that received the MTU message is running, further comprising:

stopping an MTU timer for the port that received the message comprising the received MTU;

changing the MTU for the ports of the network node to a previous MTU; and taking corrective action.

19. The method of claim 16, in response to an MTU timer reaching an MTU timeout, further comprising:

changing the MTU for the ports of the network node to a previous MTU; and taking corrective action.

20. The apparatus of claim 1, further comprising an MTU message circuit configured to, in response to the MTU approval circuit determining that the received MTU is supported, send a message to network nodes connected to ports of the network node, the message comprising the received MTU.

* * * * *